D. MAGNER.
Apparatus for Breaking and Subduing Horses.

No. 229,541.  Patented July 6, 1880.

Attest:
J. Henry Kaiser
S. B. Hildreth

Inventor:
Dennis Magner
By E. A. Hildreth Atty.

UNITED STATES PATENT OFFICE.

DENNIS MAGNER, OF BROOKLYN, NEW YORK.

APPARATUS FOR BREAKING AND SUBDUING HORSES.

SPECIFICATION forming part of Letters Patent No. 229,541, dated July 6, 1880.

Application filed January 28, 1880.

*To all whom it may concern:*

Be it known that I, DENNIS MAGNER, residing in Brooklyn, Kings county, and State of New York, have invented a new and useful Apparatus for the Subjection, Taming, and Breaking of Horses, of which the following is a specification.

The nature and object of my invention are to construct a machine in which the horse to be trained, broken, or subdued can be controlled in such a manner that he cannot kick to do any harm, nor throw himself, nor run away, and if he balks the power can be used in such a way that he will be compelled to go at command until docile and obedient.

Figure 1:
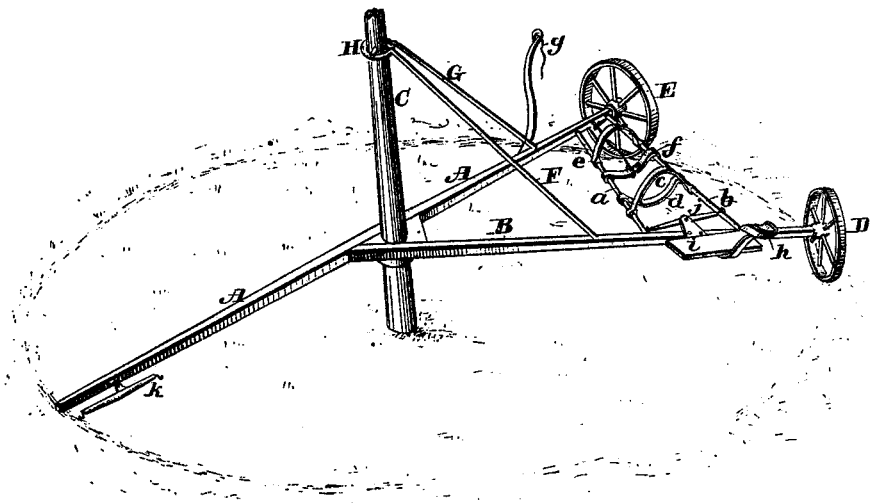
Figure 2:
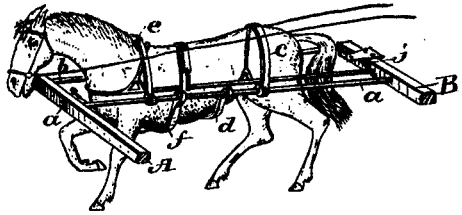
Figure 3:
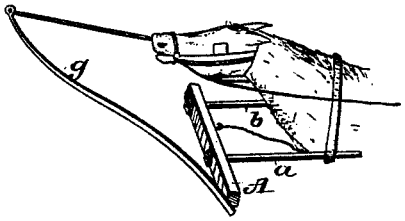
Figure 4:
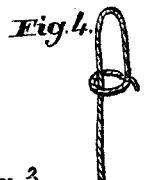

In the accompanying drawings, in which similar letters of reference indicate like parts, Figure 1 represents a machine for breaking or subduing horses embodying my invention. Fig. 2 illustrates how the horse to be trained is secured into the machine. Fig. 3 illustrates the method of attaching a balky horse in the machine when such a horse is to be taught to submit and obey. Fig. 4 illustrates the construction of the cord-bridle, to be applied to a balky horse in securing him into the machine.

C represents a central pivot, post, or pillar, which may be held firmly in position, allowing the revolving arms A and B to revolve upon the central post; or the central post may be constructed to revolve with the revolving arms.

The arms A and B are provided at their outer extremity with large carrying-wheels E D, (see Fig. 1,) which revolve freely, resting upon the ground, and, rolling in a circle around the central column, C, support the arms A and B.

The revolving bars A and B are braced and strengthened by brace-arms G and F, extending from the revolving arms to a ring upon the upper portion of the central column.

*a* and *b* serve as thill or shaft bars, and are securely fastened in their proper position at each end to the revolving main-frame arms A and B. The outer bar, *b*, can readily be removed to allow the animal to enter, and then the bar *b* is replaced and secured in position.

A platform, *i*, seat *h*, and whiffletree *j* are secured to the revolving main bar B in rear of the thill-poles *a* and *b*. Strong straps *e*, *f*, *d*, and *c* are passed from the thill-bar *a* to the thill-bar *b*.

*k* is a whiffletree, placed upon the opposite end of the revolving beam A, to which a gentle horse can be attached when it is desired to subdue a balky horse.

When a horse or colt is to be trained or broken the outside bar, *b*, is first removed. The animal is then led into position by the side of the bar *a*, and the bar *b* is then replaced and secured in position. The strap *e* is placed over the shoulders of the animal and is secured on each side to the thill-bars *a* and *b*. (See Fig. 2.) The strap *c* is placed over the hips of the animal, and the straps *f* and *d* are passed under the animal, all being secured at each end to the bars *a* and *b*, as illustrated in Fig. 2.

A harness can be placed upon the horse, as usual, and the tugs secured to the whiffletree *j*, and the breeching-straps secured to the thill-bars *a* and *b*.

Ordinary reins can be used in driving, and the trainer can ride in the seat *h* or on the revolving main-frame arms.

No matter how vicious or headstrong a runaway horse may be when placed in this machine, the faster and more determined he runs the sooner he must from necessity become gentle. He has not the power to get away, rear up, throw himself, or kick to do any harm. He must go in a circle without being exposed to any possible harm until he is submissive and gentle.

One of the conditions of success to which especial attention is here directed is, that when the horse undertakes to run away he is carried around in a circle so rapidly that he becomes so completely dizzy and drunk that he would fall down helpless if not confined and supported, thus exerting one of the most powerful, yet harmless, means of influencing and subduing or making gentle an unmanageable or dangerous runaway horse.

In the case where a horse is afraid of a buffalo-robe or umbrella the animal is first placed securely in my machine, as described. He is then approached with the object of which he is afraid, which can be safely done. If he attempts to run away, the umbrella or robe can be held over him, as desired, by standing on the platform inside him, or on the seat behind, until he is subdued by the effort to get away.

If the animal is a wild vicious colt placed in my machine he can be safely touched and accustomed to being handled without danger or difficulty until proved to be gentle and obedient.

If the animal is a headstrong runaway kicker, afraid to have anything touch his quarters, he is, after being put into my machine, compelled to submit to a pole, harness, or other cause of fear being put upon and brought around the body, as desired. His efforts to get away and running around a few times will make him so helpless and dizzy that he can be soon made entirely gentle and regardless of all such causes of fear or excitement.

If the horse is bad to bridle or handle about the head, he can now be handled as desired until submissive. If afraid of having the rein caught under the tail and inclined to run away under such circumstances, in my machine he can with ease and safety be reduced to subjection.

A kicking horse is held down by the strap $c$ passing over his hips, so that he cannot do any harm by kicking, and by being driven rapidly around a few times in this machine he can be soon forced to a condition of docility.

This machine will be found especially adapted and valuable for the easy and safe subjection of unbroken colts and nervous excitable runaway or kicking horses.

In my machine the position of the horse and thill-shafts can be reversed, if necessary, to accustom the animal to go in the other direction.

In the case of a balky horse I proceed as follows: First, secure the animal into the machine, as heretofore described. Next take a strong hemp cord about three-eighths of an inch in diameter of sufficient strength. Tie one end into a firm knot. About ten inches from this knot make another knot, and before drawing it tight put the end knot through it, which will make a simple loop, that will not draw smaller, about the size necessary to pass over the lower jaw of the animal. When done put on over the lower jaw, pass the other part over the head, back of the ears, beneath where the halter or bridle rests, and pass down back of the jaw through the loop before explained, which is around the jaw, and pull down until it rests closely upon the head. The shape of the cord forming such a halter is illustrated in Fig. 4. Now, with the horse in position, tie the other end of the rope to the end of the pole $g$, as illustrated in Fig. 3, just short enough so that the horse has entire freedom when he will go along, but when refusing to go will give direct purchase upon the head whenever the machine is moved around, which will force the horse forward off his feet and compel him to go as desired. A gentle horse is attached to the whiffletree $k$ at the other end of the main-frame beam A. The gentle horse will start at command, and his whole force is brought directly upon the head of the balky horse, if he refuses to go, by the attachment of the cord, as before described, from the strong pole $g$, which can be secured to the main frame A, or to the main frame A and B, if desired.

If the balky horse attempts to throw himself, acts sulky, and will not go, he can be made to go either by the attachment of the cord to the head or by forcing him from his feet by means of his harness, using the power of a gentle horse at the other end of the revolving main frame.

When the cord is applied as described and the power of a gentle horse is employed, there will be brought by the cord referred to such a powerful pressure upon the spinal marrow of the horse upon the top of his head, between the atlas and occipital bones, as to impress the horse so powerfully with a sense of his helplessness that he is discouraged with the greatest ease and safety from repeating or persisting in the habit.

Having thus described the nature, operation, and uses of my invention, what I claim as new, and desire to secure by Letters Patent, is—

An improved apparatus for subduing vicious horses, consisting of the frame A B, provided with wheels at their outer ends or some suitable support, in combination with a central post, to which the frame is secured and around which it may rotate, and the thills $a\ b$, and suitable straps for securing the animal thereto, substantially as shown and described.

DENNIS MAGNER.

Witnesses:
 EDWIN A. HILDRETH,
 CHAS. H. SHEPARD.